United States Patent [19]

Florjancic

[11] 3,715,271
[45] Feb. 6, 1973

[54] BOILING WATER REACTOR PLANT

[75] Inventor: Dusan Florjancic, Winterthur, Switzerland

[73] Assignee: Sulzer Brothers Ltd., Winterthur, Switzerland

[22] Filed: June 28, 1971

[21] Appl. No.: 157,437

[30] Foreign Application Priority Data

July 1, 1970 Switzerland..................9961/70

[52] U.S. Cl. .....................176/54, 417/406, 176/87
[51] Int. Cl. ..............................................G21c 15/24
[58] Field of Search..........176/54, 55, 56, 61, 65, 87; 165/85, 108, 120; 417/406, 409; 103/83

[56] References Cited

UNITED STATES PATENTS

| | | | |
|---|---|---|---|
| 3,231,474 | 1/1966 | Jones et al. | 176/56 X |
| 3,279,384 | 10/1966 | Jekat et al. | 417/406 X |
| 2,873,945 | 2/1959 | Kuhn | 417/406 |
| 3,102,490 | 9/1963 | Shiley | 417/406 X |
| 3,171,355 | 3/1965 | Harris et al. | 417/406 X |
| 3,203,867 | 8/1965 | Williams et al. | 176/65 X |
| 3,401,082 | 9/1968 | Ammon et al. | 176/54 |

FOREIGN PATENTS OR APPLICATIONS 966,743   8/1964   Great Britain..........................176/65

*Primary Examiner*—Benjamin R. Padgett
*Assistant Examiner*—E. E. Lehmann
*Attorney*—Kenyon & Kenyon Reilly Carr & Chapin

[57] ABSTRACT

The socket serves as an inlet for feed water and as a housing for the turbine shaft which drives the pump. The socket includes a duct which delivers feed water directly into the water chamber as well as a duct for feeding the water discharged from the turbine into the water chamber via the pump.

13 Claims, 5 Drawing Figures

BOILING WATER REACTOR PLANT

This invention relates to a boiling water reactor plant.

Boiling water reactor plants have been known in which a circulating pump for circulating water within a water chamber of a pressure vessel has been driven by a water turbine which has been operated with feed water. This provides an advantageous construction by virtue of the fact that complicated seals between the circulating pump and the drive for the pump may be omitted.

The object of this invention is to provide a plant which is simpler and more reliable than previous plants of this kind.

Briefly, the invention provides a boiling-water reactor plant which is characterized in that the water turbine is disposed on a connecting socket situated in known manner below the water level in the pressure vessel but disposed above the reactor core. In addition, the driving shaft for the circulating pump is brought through the socket and at least one duct is provided in the socket for introducing feed water discharged from the turbine into the water chamber of the reactor.

The invention enables a minimum number of connecting sockets on the pressure vessel to be used. Further, connecting sockets, which are otherwise provided on the pressure vessel of the reactor for the supply of feed water, may be used for the driving turbines and their shafts.

The connecting sockets are disposed above the reactor core and near the water level of the water chamber to enable the thermo-siphon effect of the colder feed water to be utilized. With respect to the circulating pumps, this feature provides the advantage that the water level need be lowered only below the level of the circulating pump for the purpose of repairs to be carried out to the turbine or to the pump. Thus, the reactor core may remain under water. The absence of additional connecting sockets for the turbine also plays an important part since the production of the connecting sockets is expensive and since their presence represents hazardous zones of the pressure vessel as they are subject to complex stress conditions and usually require welding seams which can be controlled only with a great effort.

In one embodiment, the impeller of the circulating pump is sized so as to be removed outwardly through the connecting socket. In particular, this substantially facilitates the previously mentioned repair of a circulating pump.

In another embodiment, the connecting socket also has a duct for the supply of feed water into the water chamber of the reactor which bypasses the turbine. As a result, this dispenses with the need for separate apertures or sockets in the pressure vessel. In some circumstances, it is possible for the duct in the connecting socket to be the same duct which carries the feed water discharged from the turbine.

In another embodiment, the feed water is admixed to the circulating flow in the pressure vessel within the circulating pump. This feature enables a particularly simple embodiment to be obtained which in some circumstances offers further advantages. For example, by admixing upstream of the pump impeller, it is possible for the water flowing through the pump to be cooled, thus increasing the available thermal suction head since the vapor pressure of the circulated water is lowered at this position.

In another embodiment, the circulating pump is provided with diffuser blades on the inlet side. These diffuser blades are further provided with ducts which extend outwardly into the delivered flow and are connected to the ducts for supplying the feed water. In such a system, simple means provide very uniform intermixing of the feed water with the circulating flow. This is advantageous for the previously mentioned purpose of increasing the suction head of the pump.

In a particularly advantageous embodiment, the impeller of the circulating pump is provided with ducts formed in the blades. These ducts extend outwardly into the delivered flow and are connected to the duct for introducing feed water so as to form a laminar flow of feed water along the surface of the blade. This results, in a particularly effective manner, in an increase of the suction head of the pump since this achieves a targeted cooling of those zones of the pump at which there is a risk of vapor bubble formation. The remaining feed water may be introduced into the diffuser of the circulating pump, that is, downstream of the impeller. Accordingly, the feed water is not conducted through the pump so that the pump may be constructed to smaller dimensions.

These and other objects and advantages of the invention will become more apparent from the following detailed description and appended claims taken in conjunction with the accompanying drawings in which:

FIG. 1 diagrammatically illustrates a cross-sectional view through a boiling-water reactor with the circulating pumps disposed in accordance with the invention;

Figure 1:
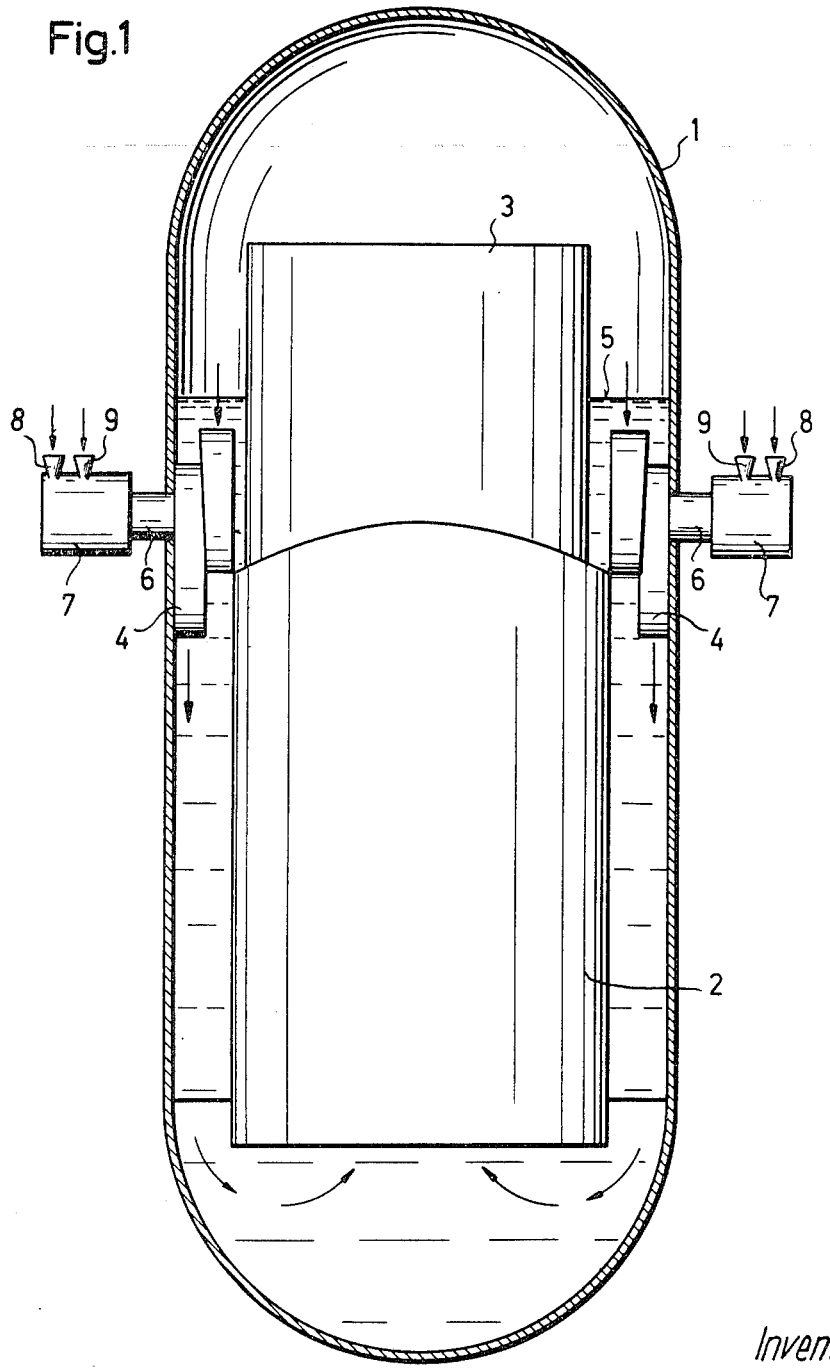

Referring to FIG. 1, a boiling-water reactor has a pressure vessel 1 defining a water chamber, a reactor core 2, a steam trap 3 and a plurality of circulating pumps 4 which are disposed below the water level 5 in the vessel 1 but are disposed above the reactor core 2. The shafts of the circulating pump impellers (not shown) extend through connecting sockets 6 on which the casing 7 of water turbines are mounted for driving the impellers of the pumps 4. The casings 7 contain pipe connections 8 and 9, both of which are provided for the supply of feed water. One of these connections serves for the supply of feed water for driving the turbines while the other connections serve for the direct supply of feed water into the reactor while bypassing the turbines. The arrows in FIG. 1 indicate the flow directions of the circulating flow in the water chamber of the reactor and that of the feed water.

Figure 2:
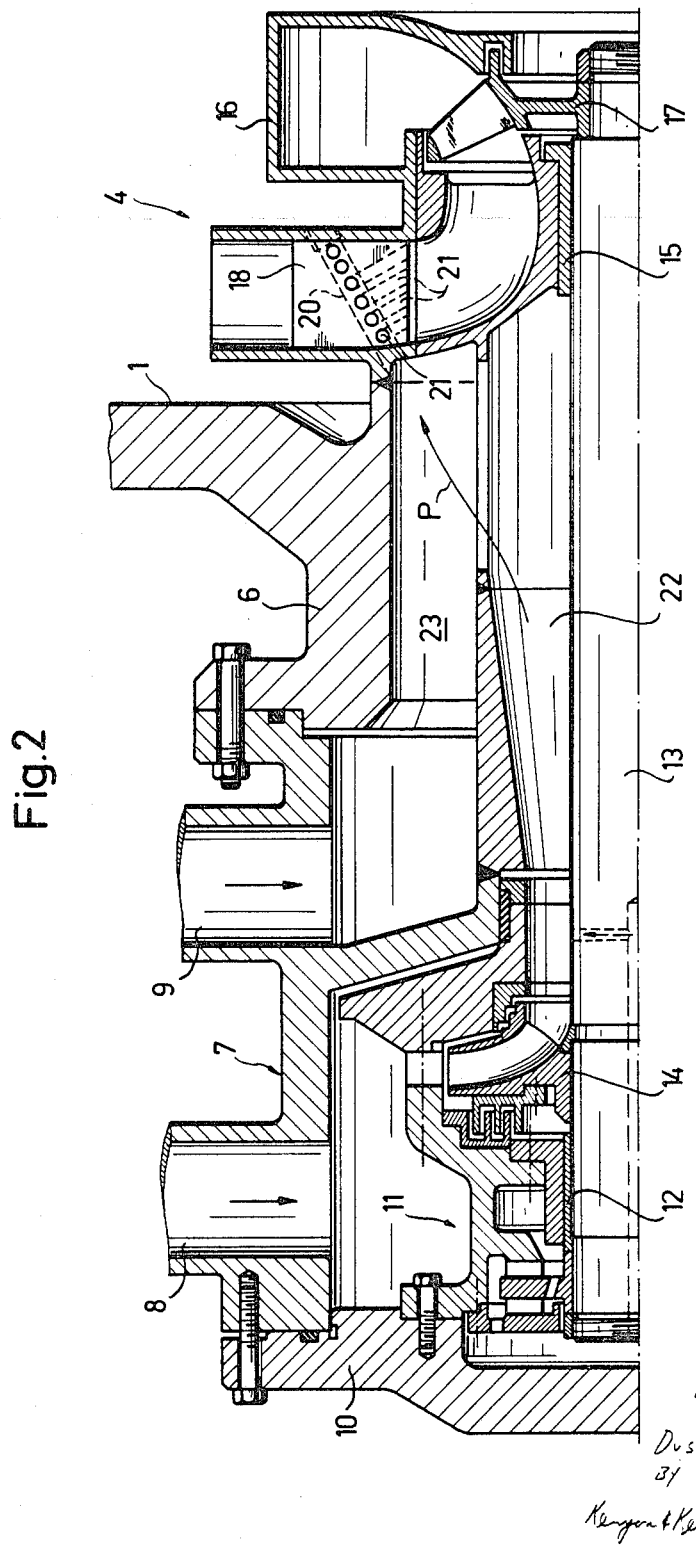
FIG. 2 illustrates a cross-sectional view of one embodiment of a circulating pump for the reactor according to FIG. 1.

Referring to FIG. 2, wherein like reference characters indicate like parts as above, the water turbine casing 7 is closed by a cover 10 and houses turbine elements 11, as are known, a bearing 12 for a shaft 13 and a rotor 14. The other end of the shaft 13 is supported in a bearing 15 in a pump casing 16 and serves to support an impeller 17. Upstream of the impeller 17, as seen by reference to the flow direction of the circulated water, the pump casing 16 is provided with stationary diffuser blades 18 each of which has a bore 20 and bores 21 disposed transversely thereto and extending outwardly. As shown, the bores 20 of each blade 18 extend across the blade 18 while the bores 21 extend to the free edge of the blade 18.

As indicated by the arrow P in FIG. 2, the feed water discharged from the rotor 14 of the turbine flows through an annular chamber 22 about the shaft 13 into a surrounding annular chamber 23 associated therewith and disposed in the connecting socket 6. The annular chamber 23 is also connected at one end to the supply duct 9 for the feed water and at the opposite end to the bores 20 in the diffuser blades 18 of the pump 4. During operation, the feed water discharged from the rotor 14 of the turbine or supplied through the duct 9 passes from the annular chamber 23 into the bores 20 of the blades and from there through the bores 21 into the circulating flow conducted through the pump 4.

As shown, the connecting sockets 6 provide for the mounting of the driving turbines for the circulating pumps 4 as well as for the supply of feed water. Accordingly, the need for separate sockets for the driving shafts of the circulating pumps together with their seals is avoided. An additional advantage is obtained in that the circulating flow in the pump is cooled by the admixture of cooler feed water so that the risk of vapor bubbles, which result in a deterioration of the suction effect in the pump, are avoided. This is particularly important in the case illustrated in FIG. 1, in which the circulating pumps are disposed above the reactor core and below the water level 5. At this position, the circulating pumps have only a very low inlet head; this position being advantageous for operational reasons since it is merely necessary to lower the water level in the reactor to enable the pumps to be dismantled. The illustrated embodiment suppresses the generation of vapor bubbles and as a result of this feature in some cases, only for the first time, permits correct functioning of the circulating pumps.

Figure 3:
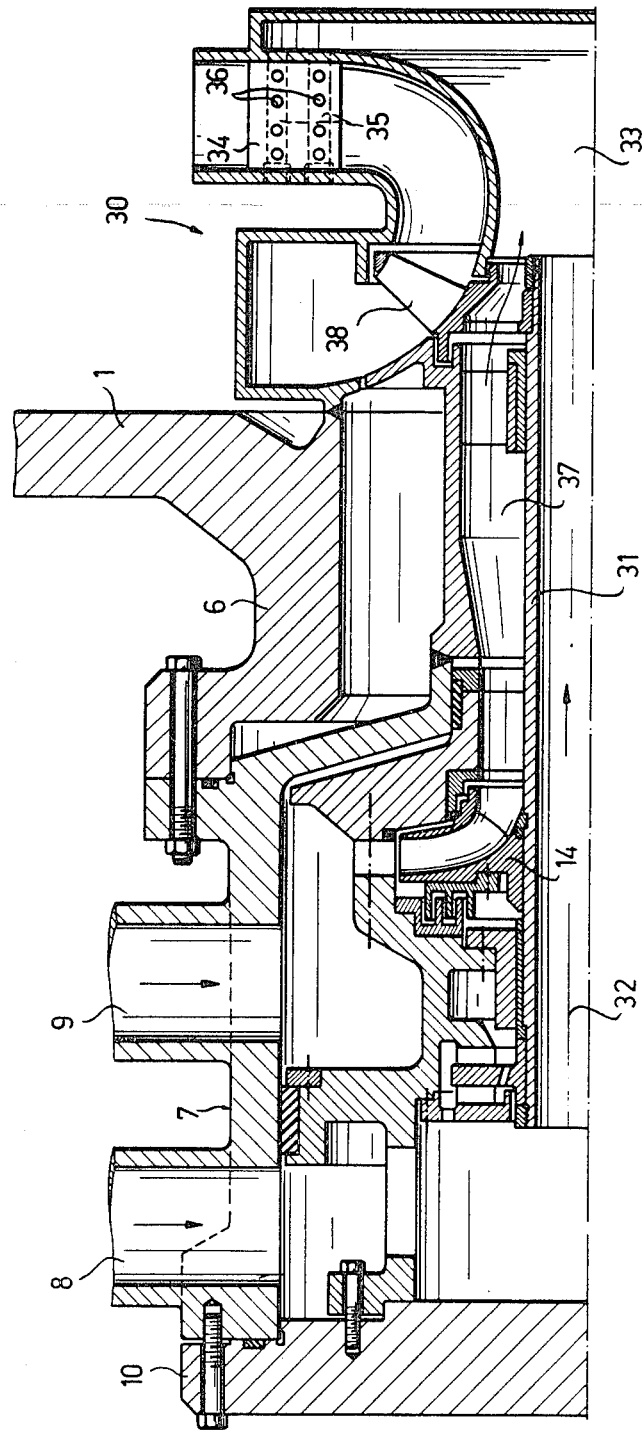
FIG. 3 illustrates a cross-sectional view of another embodiment of the circulating pump together with its drive according to the invention.

Referring to FIG. 3 wherein like reference characters indicate like parts as above, the casing of a pump 30 is reversed relative to the casing of the pump 4 of FIG. 2 so that the pump position corresponds to that illustrated in FIG. 1. In this embodiment, the rotor 14 of the turbine is mounted on a hollow shaft 31 having a bore 32. The feed water can thus pass from the duct 8 while bypassing the turbine through the bore 32 into a casing part 33 of the circulating pump 30. In this case, the casing of the pump 30 is provided with stationary diffuser blades 34 having bores 35, 36. The bores 35 extend across the blades 34 while the communicating bores 36 extend to the surface of the blades 34. The feed water, flowing through the rotor 14 of the turbine, also reaches the casing part 33 through an annular chamber 37. From the casing part 33, the feed water flows through the ducts 35 and 36 outwardly and is admixed to the circulating flow upstream of the impeller 38 of the circulating pump. The method of operation and action of the embodiment according to FIG. 3 are identical in all other respects to those of the embodiment illustrated in FIG. 2 and need not be further detailed.

Figure 4:
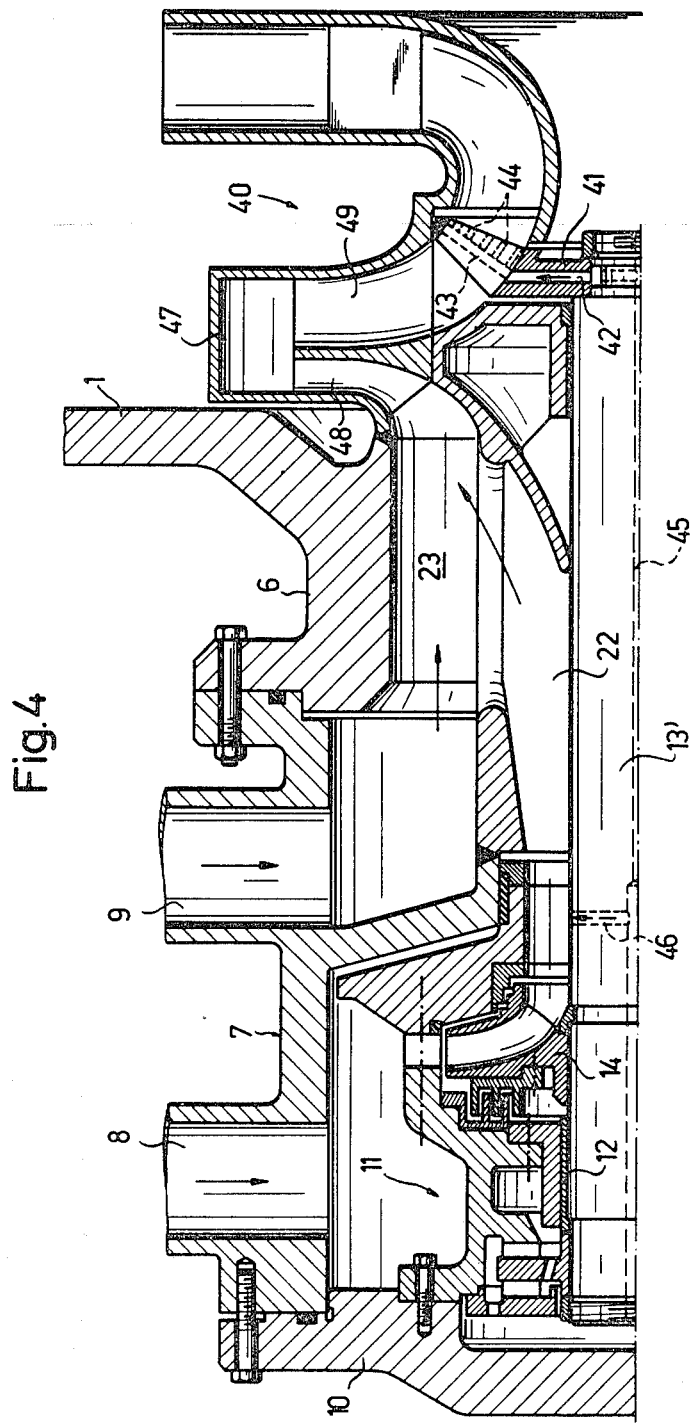
FIG. 4 illustrates a cross-sectional view of a particularly advantageous embodiment of the circulating pump and its drive for a nuclear reactor according to FIG. 1.

Referring to FIG. 4 wherein the left-hand part of the construction with the socket 6 and the driving turbine is identical to the embodiment illustrated in FIG. 2 and is designated with the same reference characters, a pump 40 which is disposed in a manner similar to that illustrated in FIG. 3, contains an impeller 41 having ducts 42, 43 and 44 which extend from the eye of the impeller 41 into the blades and from there outwardly. The ducts 42, 43, 44 are connected to an axial bore or duct 45 of the shaft 13' which is supplied through a radial bore 46 with feed water discharged from the rotor 14 of the turbine. In addition, the pump 40 is provided with a diffuser 47 having separate flow ducts 48, 49 for the circulating flow and for the feed water supplied thereto.

In operation, the feed water is admixed to the circulating flow only downstream of the impeller 41 of the circulating pump 40. Only a smaller quantity of water is required for recirculation so that the pump and, therefore the driving turbine, may be constructed in a smaller size. However, the advantageous effect of cooling due to the flow through the pump is thus omitted. Accordingly, the ducts 42 to 44 are formed in the impeller 41 to supply cool feed water into the blades. The feed water discharged outwardly from the ducts 44 forms a laminar flow, extending along the surface of the blade and thus directly cooling the zone in which there is a risk of vapor bubble formation. A smaller amount of cooling water in the form of feed water is required in this construction to achieve the same effect as regards the suppression of vapor bubbles.

The inlet sockets of the circulating pumps according to FIGS. 2, 3, and 4 may be axially symmetrical solids of rotation or, according to the drawing in FIG. 1, they may form inlet funnels which are open only at the top. A construction with one axial inflow is also possible as shown in FIG. 5.

Figure 5:
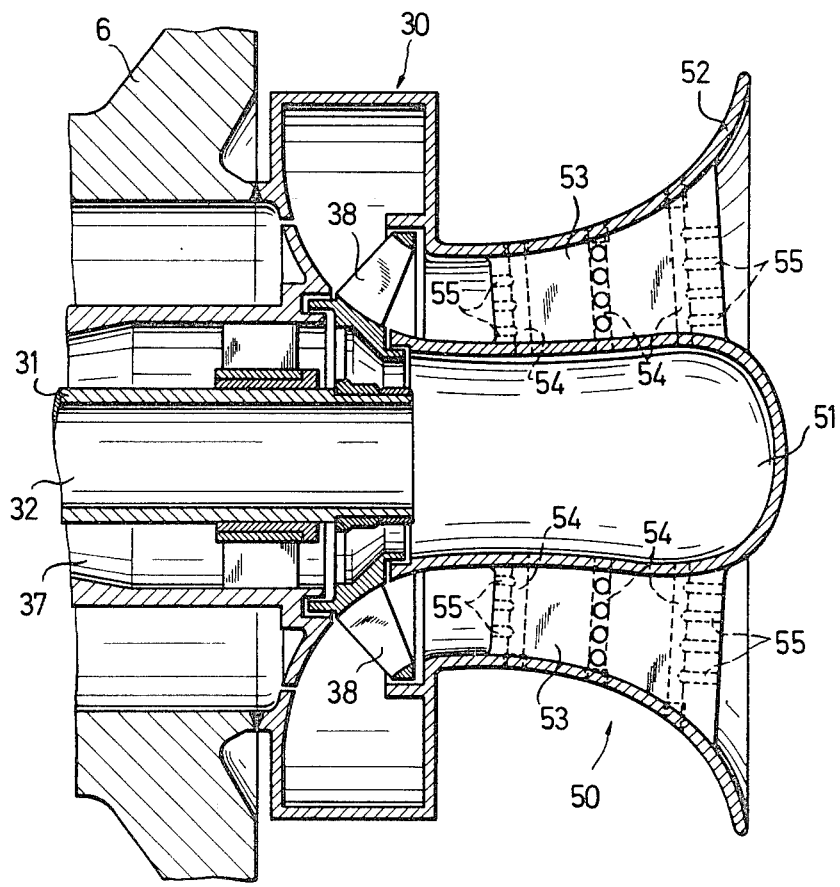
FIG. 5 illustrates a cross-sectional view of a modified embodiment of the circulating pump of FIG. 3 according to the invention.

Referring to FIG. 5 which represents a modified embodiment of the arrangement illustrated in the right-hand part of FIG. 3, the pump 3 contains a suction socket 50 having a hollow inner member 51. The cavity of the member 51 is connected to the bore 32 of the hollow shaft 31. Diffuser blades 53 are disposed between the inner member 51 and an outer jacket 52. These diffuser blades have radial bores 54 communicating with the cavity of the member 51 and adjoining outwardly extending bores 55 through which the feed water, supplied through the ducts 32 and 37 may be admixed to the circulating flow delivered through the pump 30.

It will be evident that in the embodiment illustrated in FIG. 4 as well as in the embodiment illustrated in FIGS. 2 and 3, it is possible for different methods of cooling the blades or of the flow passing by the blades to be employed. For example, methods as proposed in U.S. Pat. application, Ser. No. 157,438, filed June 28, 1971 can be used.

As can be seen by reference to FIGS. 2 to 5, the pump in all embodiments is constructed so that removal of the casing 7 simultaneously enables the shaft 13 or 13', 32 to be removed together with the impeller of the circulating pump. Only the pump casing with the inlet socket, the diffuser blades and the diffuser remains in the pressure vessel. This measure substantially facilitates any repairs of the pump impeller which may become necessary.

What is claimed is:

1. A boiling water reactor plant comprising
a pressure vessel defining a water chamber for a level of water therein;
a reactor core disposed in said chamber below the level of water within said chamber;
at least one circulating pump in said vessel having an impeller for circulating water through said pump;
a connecting socket secured to said vessel below the level of water and above said reactor core;
a driving shaft connected to said pump for driving said impeller of said pump, said shaft passing out of said vessel through said socket;
a water turbine mounted on said socket and connected to said driving shaft outside said vessel for driving said shaft;
means for passing a flow of feed water through said turbine for driving said turbine;
at least one duct in said socket for receiving feed water discharged from said turbine and for introducing the discharged feed water into said pump; and
means connected to said duct for admixing feed water supplied from said duct with a circulating flow of water in said pump upstream of said impeller.

2. A boiling water reactor plant as set forth in claim 1 wherein said impeller is of a size smaller than the internal periphery of said socket for passage therethrough upon dismantling of said pump.

3. A boiling water reactor plant as set forth in claim 1 further comprising at least one duct in said socket bypassing said turbine for supplying feed water into said water chamber.

4. A boiling water reactor plant as set forth in claim 1 wherein said pump has a plurality of diffuser blades on an inlet side thereof, and said admixing means includes bores within each blade extending outwardly thereof into the circulating flow, said bores being connected to said duct in said socket for discharging feed water from within said blades into the circulating flow.

5. A boiling water reactor plant as set forth in claim 1 wherein said admixing means includes bores within said impeller extending outwardly thereof into the circulating flow, said bores being connected to said duct in said socket for discharging feed water from within said impeller onto the surface of said impeller to form a laminar flow of feed water thereon.

6. A boiling water reactor plant as set forth in claim 1 wherein said pump has a diffuser downstream of said impeller and said socket includes a duct for introducing feed water into said diffuser from said socket.

7. A boiling water reactor plant as set forth in claim 1 wherein said duct is disposed axially within said shaft.

8. A boiling water reactor plant comprising
a pressure vessel defining a water chamber for a level of water therein;
a reactor core disposed in said chamber below the level of water within said chamber;
at least one circulating pump in said vessel having an impeller for circulating water through said pump;
a connecting socket secured to said vessel below the level of water and above said reactor core;
a driving shaft connected to said pump for driving said impeller of said pump, said shaft passing out of said vessel through said socket;
a water turbine mounted on said socket and connected to said driving shaft outside said vessel for driving said shaft;
means for passing a flow of feed water through said turbine for driving said turbine; and
at least one duct in said socket for receiving feed water discharged from said turbine and for introducing the discharged feed water into said pump upstream of said impeller.

9. A boiling water reactor plant as set forth in claim 8 wherein said impeller of said pump is of a size smaller than the internal periphery of said socket for passing therethrough upon dismantling of said pump.

10. A boiling water reactor plant as set forth in claim 8 further comprising at least one duct in said socket bypassing said turbine for supplying feed water into said water chamber.

11. A boiling water reactor plant as set forth in claim 8 further comprising means for admixing feed water supplied through said socket with a circulating flow of water in said pump.

12. A boiling water reactor plant as set forth in claim 11 wherein said pump has a plurality of diffuser blades on an inlet side thereof, and said admixing means includes bores within each blade extending outwardly thereof into the circulating flow, said bores being connected to said duct in said socket for discharging feed water from within said blades into the circulating flow.

13. A boiling water reactor plant as set forth in claim 11 wherein said admixing means includes bores within said impeller extending outwardly thereof into the circulating flow, said bores being connected to said duct in said socket for discharging feed water from within said impeller onto the surface of said impeller to form a laminar flow of feed water thereon.

* * * * *